(12) United States Patent
Sato et al.

(10) Patent No.: US 6,492,033 B2
(45) Date of Patent: Dec. 10, 2002

(54) LEAD-FREE PLAIN BEARING AND METHOD FOR ITS MANUFACTURE

(75) Inventors: Issaku Sato, Tokyo (JP); Naoki Sato, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/810,341

(22) Filed: Mar. 19, 2001

(65) Prior Publication Data

US 2001/0055695 A1 Dec. 27, 2001

(30) Foreign Application Priority Data

Mar. 24, 2000 (JP) ........................ 2000-126652
Jun. 26, 2000 (JP) ........................ 2000-191337

(51) Int. Cl.$^7$ .................. B32B 15/20; B32B 15/16; B22F 7/04; F16C 13/00
(52) U.S. Cl. .................. 428/553; 428/677; 384/910; 384/912; 419/8; 92/56
(58) Field of Search .................. 428/553, 677; 148/532, 536; 75/231, 247; 384/910, 912; 419/8; 92/56

(56) References Cited

U.S. PATENT DOCUMENTS

| 4,551,395 | A | * | 11/1985 | Lloyd |
| 5,864,745 | A | * | 1/1999 | Kawagoe et al. |
| 5,875,702 | A | * | 3/1999 | Kawagoe et al. ............ 417/269 |
| 6,189,434 | B1 | * | 2/2001 | Kawaguchi et al. .......... 92/155 |
| 6,309,759 | B1 | * | 10/2001 | Tomikawa et al. |

FOREIGN PATENT DOCUMENTS

EP          0 795 693     *  9/1997

* cited by examiner

Primary Examiner—John J. Zimmerman
Assistant Examiner—Jason Savage
(74) Attorney, Agent, or Firm—Michael Tobias

(57) ABSTRACT

A lead-free plain bearing is formed by dispersing an alloy powder formed from 7–13 mass percent of Sn, 0.1–5 mass percent of Ag, and Cu on a backing, such as a steel plate, and sintering. The alloy powder may further include one or more of 0.05–0.5 mass percent of molybdenum disulfide powder and 0.1–2 mass percent of graphite powder. The bearing surface may be rough finished by machining to a roughness of 0.3–1 μm Ra and then fine finished by polishing to a roughness of at most 0.1 μRa.

20 Claims, 3 Drawing Sheets

LEAD-FREE PLAIN BEARING AND METHOD FOR ITS MANUFACTURE

BACKGROUND OF THE INVENTION

1. Field of the Invention

This invention relates to a lead-free plain bearing and a method for its manufacture.

2. Description of the Related Art

Plain bearings are bearings that provide sliding contact between opposing surfaces of the bearing and the object being supported by the bearing. Plain bearings are used in a wide variety of equipment as journal bearings, thrust bearings, and guide bearings. Plain bearings are also extensively used as or as part of swash plates in swash plate pumps.

Swash plate pumps, also referred to as in-line axial piston pumps, are widely used as compressors in automotive air conditioning systems and as pumps for hydraulic systems of construction equipment on account of their compactness and efficiency. Such pumps typically include a swash plate and a plurality of cylinders parallel to a common axis, with each cylinder containing a piston directly or indirectly in sliding contact with the swash plate. The swash plate is at an angle to the axis, and the sliding contact between the swash plate and the pistons will cause the pistons to reciprocate within the cylinders to perform a pumping action.

Swash plate pumps may operate at very high speeds (frequently on the order of 8000 rpm), and an extremely high load may be applied to the surface of the swash plate by the pistons, so this surface must have excellent bearing properties, i.e., a high seizing pressure and a low coefficient of friction.

A typical swash plate has a multilayer structure in which a thin layer of a bearing alloy is joined to a backing in the form of a disk-shaped steel plate. The steel backing plate provides the swash plate with structural integrity and decreases the cost thereof, while the bearing alloy forms a bearing surface having the desired bearing properties. If a swash plate were made entirely of a bearing alloy, it would generally have inadequate strength for use at high rotational speeds under high loads, and since a bearing alloy usually has copper as a main component, such a swash plate would be prohibitively expensive.

In general, three different methods have been used for the manufacture of multilayer swash plates. These are the pressure bonding method, the melting method, and the sintering method.

In the pressure bonding method, a plate made of a bearing alloy is superimposed on a steel backing plate, and the two plates are subjected to rolling to bond the plates to each other. However, the bond between the two plates is not extremely strong, so when a swash plate formed by this method is used in large hydraulic equipment, there are cases in which peeling occurs, so the swash plate may have a short lifespan.

In the melting method, a molten bearing alloy is cast onto a steel backing plate and is cooled until it solidifies and is joined to the backing plate. The solidified bearing alloy has oxides remaining on its surface, and due to shrinkage occurring during solidification, the surface of the bearing alloy may become uneven, so it undergoes grinding to smooth it. Due to the abrupt heating of the steel backing plate by the molten alloy, there are cases in which its surface oxidizes or undergoes deformation due to thermal strains, so the backing plate is also subjected to grinding to smooth it. The multilayer structure which is obtained in this manner is punched with a press or cut with a laser to give it a desired shape, such as circular. Thus, the melting method is not only complicated due to the large number of steps it involves, but inclusion of oxides can take place during pouring and shrinkage cavities can be formed during solidification, so there can be wide variation in bearing properties with this method.

In the sintering method, a bearing alloy powder is uniformly dispersed to a prescribed thickness on a disk-shaped steel backing plate. The backing plate and the bearing alloy powder are then heated in a furnace in a hydrogen atmosphere to sinter the grains of the powder to each other and to the backing plate. At the completion of sintering, the grains of powder retain their granular shape, so the surface of the swash plate is extremely rough, like a file. The swash plate cannot be used in this condition, since the surface formed by the bearing alloy would grind away those portions of pistons or other members contacted by it. Therefore, in order to finish the bearing surface as well as to adjust its thickness, the bearing surface formed by the bearing alloy is subjected to machining with a lathe. The sintering method involves fewer steps than the melting method, and the joint strength between the bearing alloy and the backing plate is strong, so it is generally superior to the other two manufacturing methods.

The bearing alloy used for a conventional swash plate is LBC-3, which is an alloy containing 10 mass percent of Sn, 10 mass percent of Pb, and a remainder of Cu. It has extremely good bearing properties, so a swash plate including this bearing alloy can operate for long periods of time without seizing and with little wear either of the swash plate itself or of pistons or other member in contact with the swash plate. For these reasons, LBC-3 is presently the most widely used material for the bearing surface of swash plates.

When a swash plate is manufactured by the sintering method using LBC-3, powder of LBC-3 is uniformly dispersed atop a steel backing plate, and sintering is then carried out by heating in a hydrogen atmosphere in a furnace maintained at 800° C. to obtain a multilayer member having a bearing surface. The multilayer member is refined by pressing with a 150-ton press, and then annealing is carried out in a hydrogen atmosphere in a heating furnace at 800° C. in order to remove working strains and work hardening produced by the refinement. After annealing, finishing is performed with a cutting machine to obtain a roughness of approximately 0.5 μm Ra.

Despite the good bearing properties of LBC-3, there has developed a need for a replacement for this material due to potential environmental problems. Although many metal portions of discarded automobiles or construction equipment are capable of being recycled, a swash plate with a multilayer structure generally cannot, since the bearing layer of the swash plate, usually containing a large amount of copper, is tightly joined to the steel backing plate of the swash plate, and the two cannot be readily separated from each other. If such a swash plate is simply melted with steel scrap, the copper in the bearing layer contaminates the steel and makes it totally unusable. Therefore, swash plates are usually disposed of by burial in landfills.

However, if a swash plate in a landfill is contacted by acid rain, the rain can eluate lead from LBC-3 or other lead-containing bearing alloys used in swash plates, and underground water containing such lead can end up contaminating drinking water supplies and creating the threat of lead poisoning. As a result, both the automotive industry and the construction equipment industry now desire a swash plate which does not contain lead, i.e., a lead-free swash plate.

Despite the obvious need for a replacement for LBC-3 and other lead-containing bearing alloys, lead has been considered indispensable as a solid lubricant in bearing alloys for bearings used under severe conditions such as the high loads and high rotational speeds which occur in swash plate pumps, so it has not been possible to simply omit lead from bearing alloys.

SUMMARY OF THE INVENTION

This invention provides a lead-free plain bearing which has properties equivalent to or better than those of plain bearings employing LBC-3 as a bearing alloy.

This invention also provides a method of manufacturing such a lead-free plain bearing.

The present inventors investigated the bearing properties of bearing alloys having copper as a main component and containing various metals other than lead as a solid lubricant. It was found that if a suitable amount of silver is added to a main component of copper, bearing properties roughly the same as LBC-3 are obtained. It was also found that the bearing properties of such a silver-containing bearing alloy can be further improved by the addition of one or both of molybdenum disulfide powder and graphite powder. It was further discovered that the surface roughness of a bearing alloy is an important factor in decreasing the initial wear of a plain bearing, i.e., the wear at the initial stage of use of the bearing.

Thus, according to one aspect of the present invention, a lead-free plain bearing comprises a backing and a powder consisting essentially of 7–13 mass percent of Sn, 0.1–5 mass percent of Ag, and a remainder of Cu sintered to the backing.

According to another aspect of the present invention, a lead-free plain bearing comprises a backing and a powder consisting essentially of 7–13 mass percent of Sn, 0.1–5 mass percent of Ag, at least one of 0.05–0.5 mass percent of molybdenum disulfide and 0.1–2 mass percent of graphite powder, and a remainder of Cu sintered to the backing.

According to yet another aspect of the present invention, a method of manufacturing a plain bearing includes dispersing a lead-free bearing alloy powder on a backing and sintering the powder to the backing to form a bearing surface on the backing. In a preferred embodiment, the method further includes refining the bearing surface by pressing and then annealing to remove working strains induced by the pressing. In order to give the bearing surface a desired smoothness, the method will generally include rough finishing of the bearing surface to achieve a surface roughness of 0.3–1 μm Ra, and fine finishing by polishing to a roughness of at most 0.1 μm Ra.

The backing frequently comprises a ferrous member, such as an iron or steel plate, having a shape suitable for the intended use of the bearing. For example, when the bearing is to be used as a swash plate, the backing will frequently be a steel disk. When the bearing is to be used as a journal bearing, the backing will typically be a steel plate capable of being formed into a cylinder.

A plain bearing according to the present invention can be used in a variety of different ways. For example, it can be used as or as part of a swash plate, as a journal bearing, as a thrust bearing, or as a guide bearing.

A lead-free plain bearing according to the present invention can exhibit bearing properties comparable to or superior to those of bearings employing LBC-3, even when used in severe operating conditions, such as in an automotive air conditioner compressor or in construction equipment. In particular, it has the excellent mechanical properties that there is no occurrence of damage or seizing of the bearing or members in sliding contact therewith over long periods of time. As a plain bearing according to the present invention does not contain lead, it can be disposed of by burial underground without causing environmental pollution. A manufacturing method for a plain bearing according to the present invention can reliably secure a bearing alloy to a backing, and it can make the initial wear of the bearing extremely small, resulting in a plain bearing which is ideal for use as a swash plate, for example.

DESCRIPTION OF PREFERRED EMBODIMENTS

Figure 1:
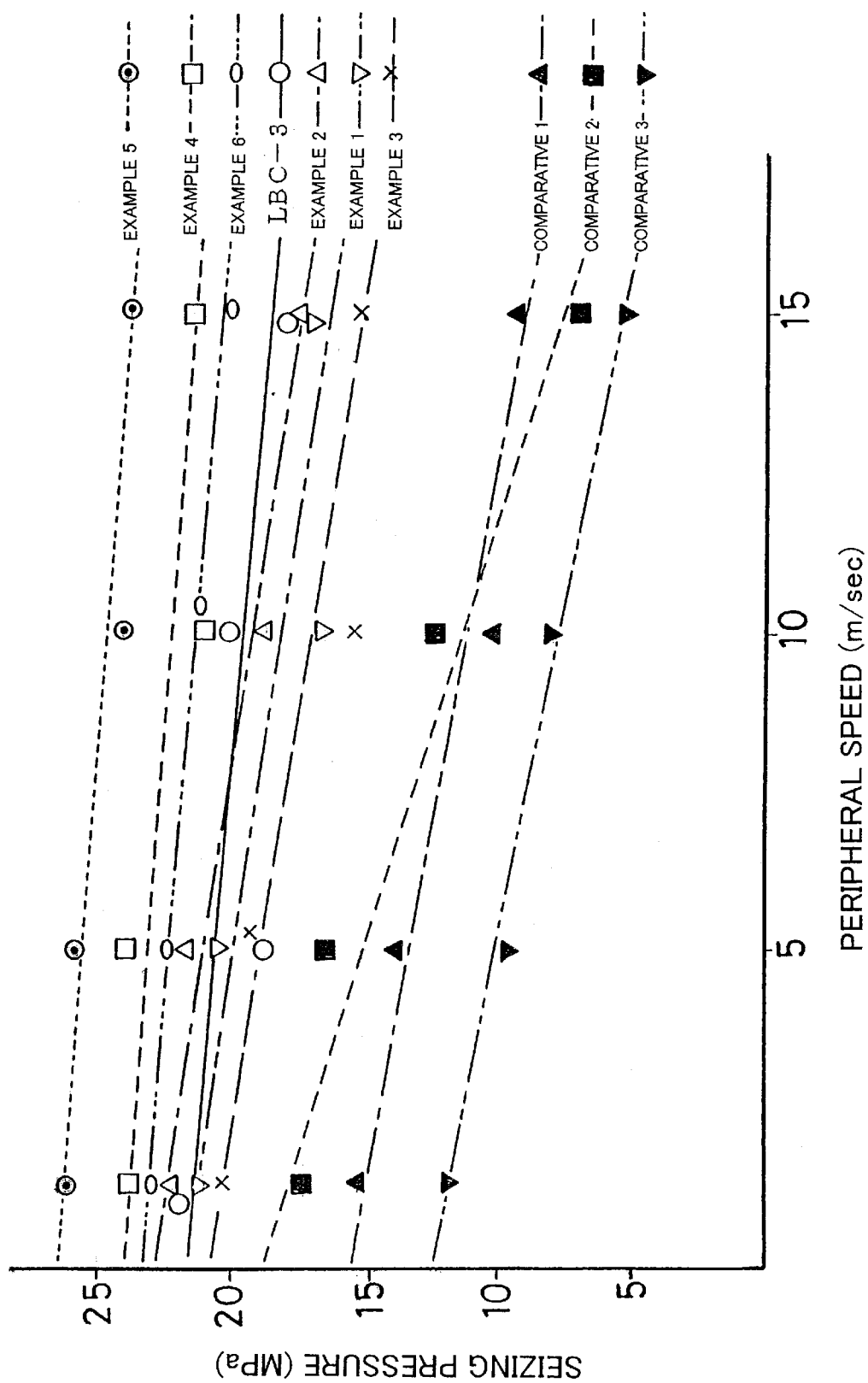
FIG. 1 is a graph showing the relationship between the seizing pressure and the peripheral speed for examples of the present invention, comparative examples, and LBC-3.

The manufacture of a lead-free plain bearing according to the present invention includes dispersing a lead-free bearing alloy powder on a backing and then sintering the powder to the backing to form a bearing alloy layer on the backing. According to one form of the present invention, the alloy powder includes 7–13 mass percent of Sn and 0.1–5 mass percent of Ag. If the amount of Sn in the powder is less than 7 mass percent, the resulting bearing will not have adequate hardness and its resistance to seizing will decrease. On the other hand, if the amount of Sn exceeds 13 mass percent, the hardness of the bearing alloy increases, but the frictional properties thereof deteriorate.

If the amount of Ag in the alloy powder is less than 0.1 mass percent, it becomes easy for seizing to occur. On the other hand, seizing also takes place if the amount of Ag is more than 5 mass percent. Therefore, the Ag content in the alloy powder is preferably 0.1–5 mass percent and more preferably 0.25–4 mass percent.

The alloy powder may also contain one or both of molybdenum disulfide powder and graphite powder. In this case, typically a Cu—Sn—Ag alloy powder will first be separately prepared, and then one or both of molybdenum disulfide powder and graphite powder will be uniformly mixed with the Cu—Sn—Ag powder.

If the amount of molybdenum disulfide is smaller than 0.05 mass percent, it has no effect on improving bearing properties, while if the amount exceeds 0.5 mass percent, the molybdenum disulfide impairs the sinterability of the bearing alloy powder, and the joining strength is decreased. The amount of molybdenum disulfide is therefore preferably 0.05–0.5 mass percent and more preferably 0.1–0.3 mass percent.

In the same manner as molybdenum disulfide, graphite improves the bearing properties of a bearing alloy. If the amount of graphite powder is less than 0.1 mass percent, the graphite has no effect on bearing properties, while if the amount exceeds 2 mass percent, sinterability is impaired and the strength with which the powder is joined to the backing is decreased. The ideal amount of graphite is 0.2–1 mass percent.

The bearing alloy powder layer is dispersed on the backing to form a layer which typically has a thickness prior to sintering of about 0.3–0.5 mm. Sintering reduces the thickness of the layer to about 0.2–0.4 mm in the case of a powder having a particle size of 40–200 micrometers.

The backing is a member which supports the bearing alloy layer and gives the bearing strength and rigidity. It is not restricted to any particular material, but typically it is a ferrous material, such as steel, since ferrous materials have good mechanical properties and at the same time are economical. The backing may be in substantially its final shape prior to the formation of the bearing alloy layer on it, or it may be subjected to cutting, bending, joining, or other procedure affecting its shape after the formation of the bearing alloy layer. Depending upon the intended use of the bearing, the bearing alloy may be formed on one or a plurality of surfaces of the backing. When the bearing is to be used as a swash plate, the backing is typically a steel disk. When the bearing is to be used as a journal bearing, the backing will generally be a steel plate capable of being bent into a cylindrical shape after the formation of a bearing alloy layer on one surface of the plate. After the plate has been bent, the opposing edges of the plate can be joined to each other to maintain the cylindrical shape, with the bearing alloy layer on the inner surface of the cylinder.

In a manufacturing method for a plain bearing according to the present invention, the sintering temperature is preferably 840–880° C. If the sintering temperature of the bearing alloy powder is lower than 840° C., an adequate bonding strength of the bearing alloy and the backing is not obtained, while if the sintering temperature exceeds 880° C., an intermetallic compound of iron and copper is formed and the bonding strength decreases.

It is known that when forming a plain bearing by sintering a bearing alloy powder having copper as a main component to a steel plate, if the sintering temperature is at least 840° C., diffusion of the bearing alloy powders with each other and between the bearing alloy powder and the steel plate is adequate and the bonding strength increases.

However, when forming a plain bearing by sintering using a LBC-3 bearing alloy, if the sintering temperature is as high as 840° C., there is the danger of the lead component in the alloy powder vaporizing and contaminating the operating environment. For this reason, sintering of LBC-3 to form a bearing is usually carried out at a temperature of approximately 800° C., at which temperature it is often the case that an adequate bonding strength cannot be obtained.

After sintering, a bearing being manufactured by the method of the present invention will usually be subjected to pressing to refine the bearing alloy and then to annealing to remove working strains induced during pressing. If the pressure applied during pressing is less than 300 MPa, the bearing alloy can not be sufficiently refined, while if the pressure is greater than 500 MPa, the bearing alloy is compressed more than necessary and the dimensional accuracy of the bearing is worsened. After pressing, the sintered alloy layer, which typically has a thickness prior to pressing of about 0.2–0.4 mm, is reduced to a thickness of about 0.15–0.3 micrometers.

The annealing temperature is preferably in the range of 840–880° C. If the annealing temperature after pressing is lower than 840° C., working strains imparted to the bearing alloy during pressing can not be removed, while if the annealing temperature exceeds 880° C., the bonding strength between the backing and the bearing alloy decreases.

The present inventors found that the lower is the initial wear of a bearing, the better are its bearing properties. The initial wear can be lowered by decreasing the roughness of the bearing surface. Namely, if the surface roughness of the bearing surface at the time of manufacture is reduced to 0.1 μm Ra or less, superior bearing properties are obtained. In order to obtain a finished surface with a roughness of at most 0.1 μm Ra, it is necessary to polish the surface with a special polishing machine. However, the bearing surface after pressing is extremely rough, and frequently too rough for polishing, so before it can be subjected to polishing, it is generally subjected to rough finishing by a cutting or grinding process to reduce the surface roughness to approximately 0.3–1 μm Ra, after which the surface can be fine finished by polishing to a roughness of at most 0.1 μm Ra.

Figure 3:
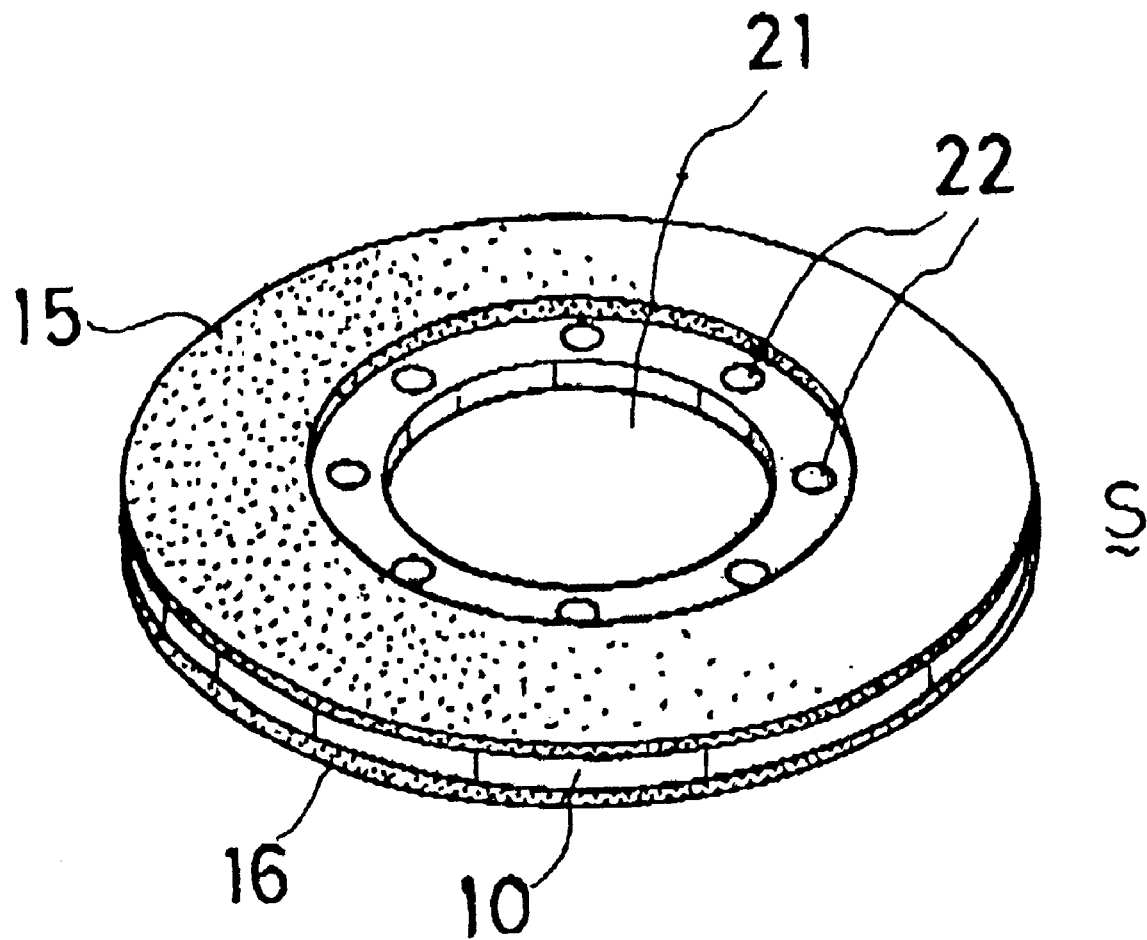
FIG. 3 is a perspective view of an example of a plain bearing according to the present invention intended for use as a swash plate in a swash plate pump.

One example of an application of a plain bearing according to the present invention is as a swash plate for a swash plate pump. FIG. 3 schematically illustrates an example of a plain bearing according to the present invention intended for use as a swash plate S in a swash plate pump, such as an automotive air conditioner. The swash plate S includes a disc-shaped steel backing plate 10 having bearing alloy layers 15 and 16 formed on opposite surfaces thereof by sintering. A hole 21 is formed at the center of the backing plate 10 for receiving an unillustrated rotational shaft of a swash plate pump, which rotates the swash plate S about the center of the shaft. The backing plate 10 can be secured to the shaft in any suitable method, such as by screws which can be passed through holes 22 formed in the backing plate 10 surrounding the central hole 21. Since the region of the backing plate 10 in which the holes 22 are formed is typically not in sliding contact with other members, the bearing alloy layers 15 and 16 can be omitted from this region. The illustrated swash plate S is intended for use in a swash plate pump having members (such as piston shoes) in sliding contact with both sides of the swash plate S. If the swash plate S is intended for use in a pump in which only one side of the swash plate S is in sliding contact with other portions of the pump, a bearing alloy layer may be omitted from the side of the swash plate S which does not undergo sliding contact.

EXAMPLES

A number of examples of a lead-free plain bearing in the form of a swash plate according to the present invention, comparative examples of a lead-free plain bearing, and an example of a conventional plain bearing using LBC-3 as a bearing alloy were prepared. The compositions of the various bearing alloys are shown in the following table:

|  | Cu | Sn | Ag | $MoS_2$ | Graphite | Pb | Ni | Mn | Cr |
|---|---|---|---|---|---|---|---|---|---|
| Example 1 | Remainder | 10 | 1 | — | — | — | — | — | — |
| Example 2 | Remainder | 10 | 1 | 0.1 | — | — | — | — | — |
| Example 3 | Remainder | 10 | 3 | — | 1 | — | — | — | — |
| Example 4 | Remainder | 10 | 1 | 0.1 | 1 | — | — | — | — |
| Example 5 | Remainder | 10 | 0.25 | — | — | — | — | — | — |
| Example 6 | Remainder | 10 | 0.1 | — | — | — | — | — | — |
| LBC-3 | Remainder | 10 | — | — | — | 10 | — | — | — |
| Comparative Example 1 | Remainder | 10 | — | — | — | — | 3 | — | — |

-continued

|  | Cu | Sn | Ag | MoS$_2$ | Graphite | Pb | Ni | Mn | Cr |
|---|---|---|---|---|---|---|---|---|---|
| Comparative Example 2 | Remainder | 10 | — | — | — | — | — | 3 | — |
| Comparative Example 3 | Remainder | 10 | — | — | — | — | — | — | 3 |
| Comparative Example 4 | Remainder | 10 | — | — | — | — | — | — | — |

Note: All values are mass %

The bearings employing a bearing alloy according to the present invention and the comparative examples of bearings were prepared by the following Method A, which is an example of a method according to the present invention, while the bearing using LBC-3 as a bearing alloy was prepared by the following Method B, which corresponds to a conventional manufacturing method. The comparative examples were also prepared by Method A but had compositions falling outside the ranges of a bearing according to the present invention.

Method A (a) Dispersing: A powder of a bearing alloy is uniformly dispersed to a thickness of 0.3 mm on a steel plate having a thickness of 5.0 mm and a diameter of 80 mm.

(b) Sintering: The steel plate and the bearing alloy powder are heated at 860° C. for fifteen minutes in a heating furnace containing a hydrogen atmosphere. The grains of the bearing alloy powders are sintered to each other and to the steel plate to form a multilayer structure including the steel plate and a bearing surface formed on the steel plate.

(c) Pressing: After sintering, the multilayer structure is pressed in a press with a pressure of 400 MPa to refine the bearing alloy in the bearing surface.

(d) Annealing: After pressing, the multilayer structure is annealed by heating at 860° C. for fifteen minutes in a heating furnace containing a hydrogen atmosphere to remove working strains and to remove work hardening.

(e) Rough Finishing: After annealing, the bearing surface of the multilayer structure is machined with a NC lathe to perform rough finishing to a surface roughness of approximately 0.5 μm Ra.

(f) Fine Finishing: The bearing surface of the rough finished multilayer structure is polished with a polishing machine to perform fine finishing to a surface roughness of 0.1 μm Ra.

Method B (A) Dispersing: A powder of a bearing alloy is uniformly dispersed to a thickness of 0.3 mm on a steel plate having a thickness of 5.0 mm and a diameter of 80 mm.

(B) Sintering: The steel plate and the bearing alloy powder are heated at 800° C. for fifteen minutes in a heating furnace containing a hydrogen atmosphere. The grains of the bearing alloy powders are sintered to each other and to the steel plate to form a multilayer structure including the steel plate and a bearing surface formed on the steel plate.

(C) Pressing: After sintering, the multilayer structure is pressed in a press with a pressure of 300 MPa to refine the bearing alloy in the bearing surface.

(D) Annealing: After pressing, the multilayer structure is annealed by heating at 800° C. for fifteen minutes in a heating furnace containing a hydrogen atmosphere to remove working strains and to remove work hardening.

(E) Finishing: After annealing, the bearing surface of the multilayer structure is machined with a NC lathe to a surface roughness of approximately 0.5 μm Ra.

Thus, Method B employs a lower sintering temperature, a lower annealing temperature, and a lower pressing load than Method A, and it does not include a fine finishing step.

The various bearings manufactured by Methods A and B were then subjected to a thrust wear test in which a load is varied in increments while oil at 80° C. is supplied to the tip of a test piece in air using a thrust friction testing machine to measure the seizing pressure of each bearing as a function of peripheral speed. The results of this test are shown in FIG. 1.

Figure 2:
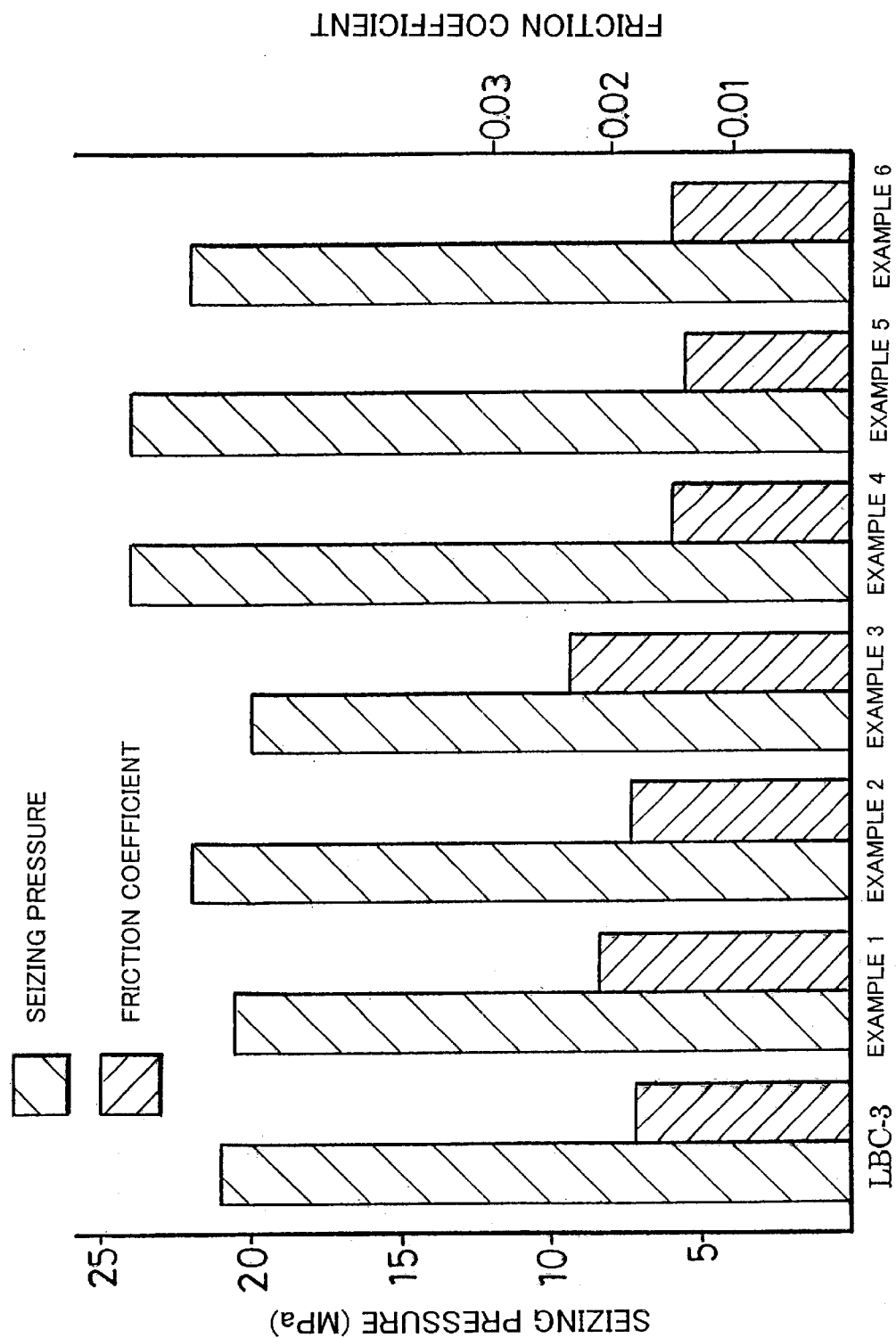
FIG. 2 is a graph showing the seizing pressure and the coefficient of friction for examples of the present invention and for LBC-3.

In addition, the seizing pressure and coefficient of friction of examples of bearings according to the present invention and of the conventional bearing employing LBC-3 were measured using a thrust friction test machine with an oil temperature of 80° C. and a peripheral speed of 16.5 meters per second. The results of this test are shown in FIG. 2. As can be seen from these figures, the bearing properties of the examples of bearings according to the present invention were superior to those of the comparative examples and were roughly comparable to or better than those of the bearing employing LBC-3.

To illustrate the effects of a manufacturing method according to the present invention, a bearing was manufactured by the above-described Method A using the bearing alloy powder of Example 1, while another bearing comprising the identical materials was manufactured by the above-described Method B. For these examples, a bearing surface was formed on both sides of each steel plate to simulate a bearing for a swash plate of an automotive air conditioner compressor of the type having piston shoes contacting both sides of the swash plate, like that shown in FIG. 3. The process of forming a bearing surface was the same for each side of the steel plate.

The shear strength of the bearing formed by Method A according to the present invention was 200 MPa, and its seizing surface pressure was 25 MPa. The shear strength of the bearing formed by conventional Method B was 160 MPa, and its seizing surface pressure was 22 MPa. The bearing formed by a manufacturing method according to the present invention thus had superior properties to one formed by a conventional method.

What is claimed is:

1. A lead-free swash plate for a swash plate pump comprising a backing and a powder consisting essentially of 7–13 mass percent of Sn, 0.1–5 mass percent of Ag, and a remainder of Cu sintered to the backing to form a bearing surface on the backing.

2. A swash plate as claimed in claim 1 wherein the bearing surface has a roughness of at most 0.1 μm Ra.

3. A swash plate as claimed in claim 1 wherein the backing comprises a steel plate.

4. A swash plate as claimed in claim 1 wherein the backing comprises a steel disk.

5. A swash plate as claimed in claim 1 having a central hole in the backing for receiving a shaft of a swash plate pump.

6. A swash plate as claimed in claim 5 having a plurality of holes surrounding the central hole for securing the swash plate to a shaft of a swash plate pump.

7. A method of manufacturing the swash plate of claim 1 comprising:

dispersing the powder of claim 1 on a backing; and sintering the powder to the backing in a hydrogen atmosphere at 840–880° C. to form a bearing surface on the backing.

8. A method as claimed in claim 7 including:

refining the bearing surface by pressing with a load of 300–500 MPa; and annealing the bearing surface in a hydrogen atmosphere at 840–880° C. after refining.

9. A method as claimed in claim 8 further including:

rough finishing the bearing surface after annealing to a surface roughness of 0.3–1 μm Ra; and polishing the bearing surface after rough finishing to a roughness of at most 0.1 μm Ra.

10. A method of operating a swash plate pump comprising rotating the swash plate of claim 1 with a rotational shaft of the pump to reciprocate a piston of the pump.

11. A lead-free swash plate for a swash plate pump comprising a backing and a powder consisting essentially of 7–13 mass percent of Sn, 0.1–5 mass percent of Ag, at least one of 0.05–0.5 mass percent of molybdenum disulfide and 0.1–2 mass percent of graphite powder, and a remainder of Cu sintered to the backing to form a bearing surface on the backing.

12. A swash plate as claimed in claim 11 wherein the bearing surface has a roughness of at most 0.1 μm Ra.

13. A swash plate as claimed in claim 11 wherein the backing comprises a steel plate.

14. A swash plate as claimed in claim 11 wherein the backing comprises a steel disk.

15. A method of manufacturing the swash plate of claim 11 comprising:

dispersing the powder of claim 5 on a backing; and sintering the powder to the backing in a hydrogen atmosphere at 840–880° C. to form a bearing surface on the backing.

16. A method as claimed in claim 15 including:

refining the bearing surface by pressing with a load of 300–500 MPa; and annealing the bearing surface in a hydrogen atmosphere at 840–880° C. after refining.

17. A method as claimed in claim 16 further including:

rough finishing the bearing surface after annealing to a surface roughness of 0.3–1 μm Ra; and polishing the bearing surface after rough finishing to a roughness of at most 0.1 μm Ra.

18. A swash plate as claimed in claim 11 having a central hole in the backing for receiving a shaft of a swash plate pump.

19. A swash plate as claimed in claim 18 having a plurality of holes surrounding the central hole for securing the swash plate to a shaft of a swash plate pump.

20. A method of operating a swash plate pump comprising rotating the swash plate of claim 11 with a rotational shaft of the pump to reciprocate a piston of the pump.

* * * * *